United States Patent [19]
Parks

[11] 3,972,089
[45] Aug. 3, 1976

[54] BRAKE DRUM DUSTER SYSTEM
[76] Inventor: Calvin G. Parks, 3043 Idlewild Way, San Diego, Calif. 92117
[22] Filed: Nov. 6, 1974
[21] Appl. No.: 521,181

Related U.S. Application Data
[63] Continuation-in-part of Ser. No. 355,541, April 30, 1973, abandoned.

[52] U.S. Cl. ................................ 15/345; 15/418; 15/422
[51] Int. Cl.² ..................................... A47L 5/14
[58] Field of Search ............. 15/303, 304, 310, 311, 15/316 R, 345, 346, 378, 405, 406, 422, 418

[56] References Cited
UNITED STATES PATENTS

| | | | |
|---|---|---|---|
| 655,156 | 7/1900 | Mote et al. | 15/345 |
| 787,388 | 4/1905 | Moorhead | 15/345 |
| 3,075,227 | 1/1963 | Bowles | 15/346 |
| 3,217,349 | 11/1965 | Hull et al. | 15/311 |
| 3,222,707 | 12/1965 | Allenbaugh | 15/345 |
| 3,510,905 | 5/1970 | Bannert | 15/345 |
| 3,678,534 | 7/1972 | Hilbig | 15/345 |
| 3,731,340 | 5/1973 | Pitre | 15/345 |
| 3,805,318 | 4/1974 | Marquette | 15/311 |

Primary Examiner—Billy J. Wilhite
Assistant Examiner—C. K. Moore

[57] ABSTRACT

A brake drum and shoe assembly duster system in which a cylindrical container having one open end and one closed end is provided with a vacuum fitting at an aperture centrally located in the closed end and a plurality of high pressure air fittings along the inside walls spaced 180° apart so that a quarter turn in each direction from insertion over brake drum and/or shoe assembly causes impingement of compressed air over the entire surface of the brake drum itself. The brake dust disloged by the high pressure air is then removed through the vacuum fitting in the center of the bottom of the cylindrical container. Adapter rings are provided for utilization of the container of the system with different sized brake drums.

2 Claims, 14 Drawing Figures

BRAKE DRUM DUSTER SYSTEM

This application is a continuation-in-part of that application for Brake Drum Duster System, Serial No. 355,541, filed Apr. 30, 1973, by Calvin G. Parks, now abandoned.

PRIOR ART

The following patents were discovered in a patentability search:

| | |
|---|---|
| Mote & King | 655,156 |
| Rossnan | 3,268,942 |
| Moorhead | 787,388 |
| Allenbaugh | 3,222,707 |
| Bannert | 3,510,905 |

BRIEF DESCRIPTION OF THE INVENTION

The present invention relates to a brake drum and shoe assembly duster system and more particularly to a brake drum and shoe assembly duster system utilizing compressed air and a vacuum for disloging and removing brake dust.

According to the invention, a brake drum and shoe assembly duster system is provided in which a cylindrical container having one open end and one closed end is provided with a central vacuum fitting in the closed end portion. A plurality of high pressure air nozzles in clusters spaced 180° apart on the inside of the housing dislodges the brake dust after which the vacuum evacuates the dust from the brake drum and/or shoe assembly. A further novel feature lies in the utilization of adapter rings on the open end for utilization with different sized brake drums.

An object of the present invention is the provision of an improved brake drum and shoe assembly duster system.

Another object of the invention is the provision of a brake drum duster and shoe assembly system which contains substantially all of the brake drum dust.

A further object of the invention is the provision of a brake drum and shoe assembly duster system utilizing standard vacuum and air pressure sources.

Yet another object of the invention is the provision of a brake drum and shoe assembly duster system which is inexpensive to manufacture and extremely convenient in use.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein.

DETAILED DESCRIPTION OF THE DRAWING

Figure 1:
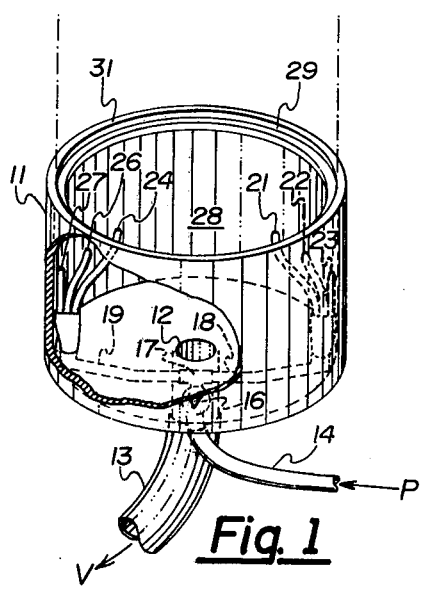
FIG. 1 is a perspective view of the preferred embodiment of the present invention.

Referring to FIG. 1, container 11 has a vacuum hose fitting 12 to which a vacuum hose 13 is attached. High pressure air line 14 is coupled through valves 16 and T connection 17 to lines 18 and 19. Line 18 terminates inside container 11 in three nozzles 21, 22 and 23. Line 19 terminates inside container 11 in three nozzles 24, 26 and 27. Inside wall 28 of container 11 terminates in a lip 29 in a top surface 31.

Figure 2:
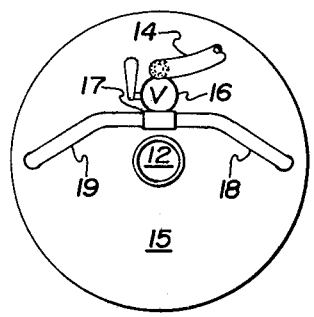
FIG. 2 is the bottom view of the embodiment of FIG. 1.

Referring to FIG. 2, container 11 has a bottom 15 with a vacuum aperture 12 therein. High pressure line 14 is coupled through valve 16 to T connection 17. Lines 18 and 19 are coupled to T connection 17 and pass through the bottom 15 of container 11.

Figure 3:
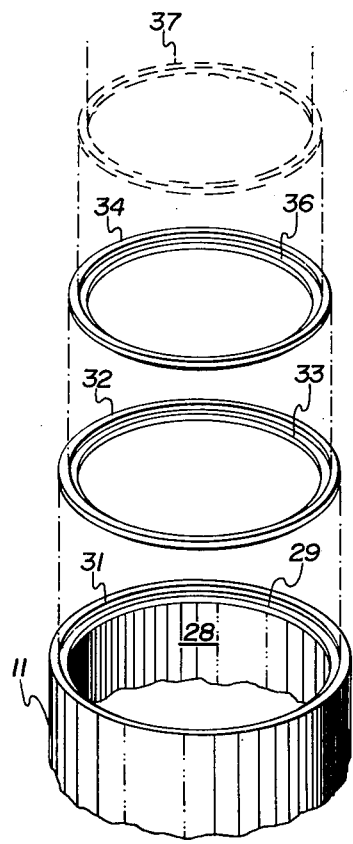
FIG. 3 is an exploded view in perspective illustrating adapter rings with the embodiment of FIG. 1.

Referring to FIG. 3, container 11 is shown having top surface 31 and inside surface 28. Inside surface 28 terminates in shoulder 29 dimensioned for receiving adapter ring 32 which has a shoulder 33 dimensioned for receiving adapter ring 34. Adapter ring 34 has a shoulder 36 dimensioned for receiving adapter ring 37.

Figure 4:
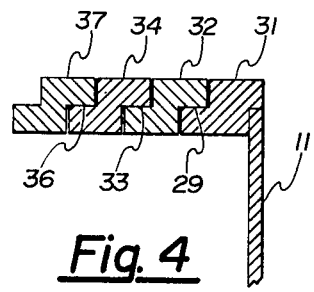
FIG. 4 is a sectional view of the adapter rings of FIG. 3 when assembled.

Referring to FIG. 4, container 11 is shown having top surface 31 with a shoulder 29 carrying adapter ring 32. Adapter ring 32 has a shoulder 33 carrying adapter ring 34. Adapter ring 34 has a shoulder 36 carrying adapter ring 37.

Figure 5:
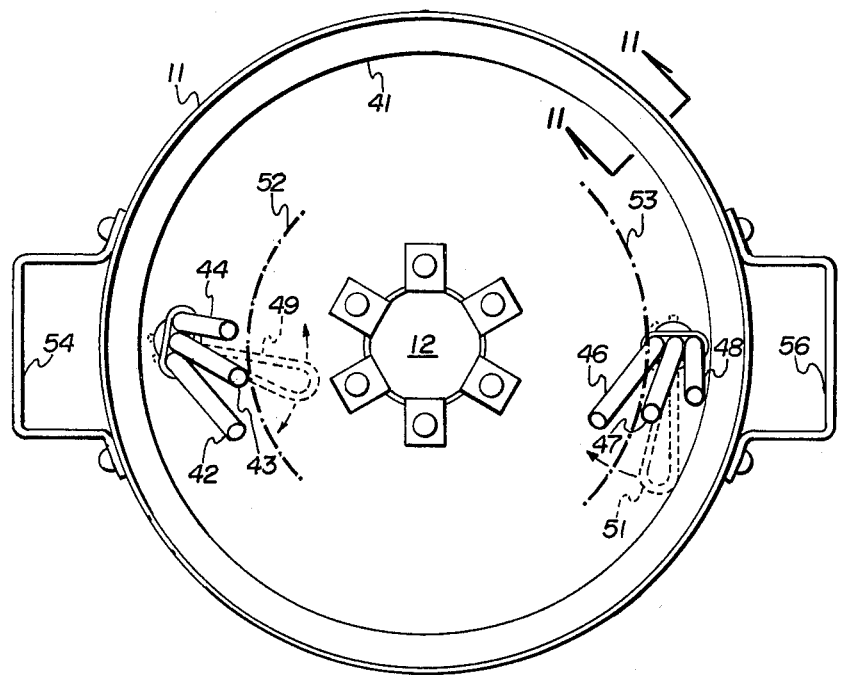
FIG. 5 is a top plan view of a modification of the embodiment of FIG. 1.

Referring to FIG. 5, container 11 carries a tube 41 and has nozzles 42, 43 and 44 in one cluster and nozzles 46, 47 and 48 in another cluster. Nozzles 42, 43 and 44 have an adjustment handle 49 and nozzles 46, 47 and 48 have an adjustment handle 51. Brake shoe 52 is shown in phantom in proximity to nozzle 42 and brake shoe 53 is shown in phantom in proximity to nozzle 47. Handles 54 and 56 are carried by container member 11.

Figure 6:
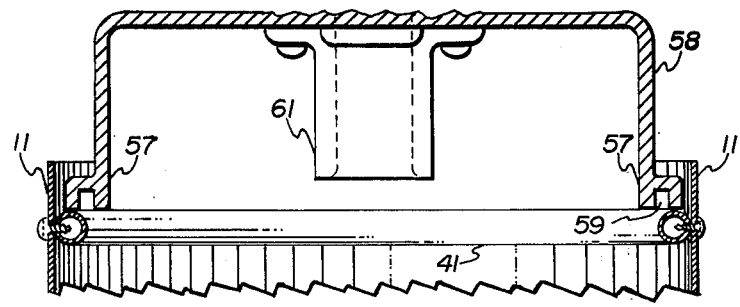
FIG. 6 is a side elevational view of the embodiment of FIG. 5 as applied to a standard brake drum.

Referring to FIG. 6, container member 11 is shown with tube 41 abutting a brake drum support flange 57 of brake drum 58. Brake drum support flange 57 has a shoe support flange groove 59. Brake drum 58 also has a hub 61.

Figure 7:
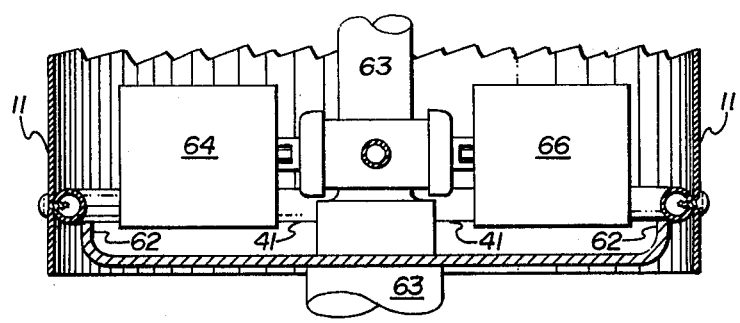
FIG. 7 is a side elevational view of the embodiment of FIG. 5 as applied to a brake shoe assembly.

Referring to FIG. 7, container 11 is again shown with tube 41 carried around the inner periphery thereof and in abutment with shoe support flange 62. Axle 63 is shown carrying brake shoes 64 and 66.

Figure 8:
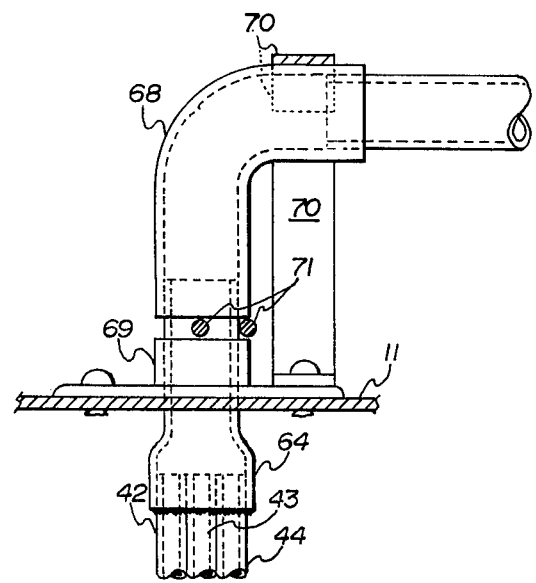
FIG. 8 is a side elevational view partially sectioned of the air nozzle adjustment assembly of FIG. 5.

Referring to FIG. 8, one cluster of nozzles is shown at 44, 43 and 42 crimped in air tube 67 which is rotatably carried by elbow fitting 68 and mounting 69 with handle 71 protruding therefrom and carried by fitting 64. Elbow 68 is brazed to a clamp 71. Clamp 71 and support fitting 69 are riveted to container 11.

Figure 9:
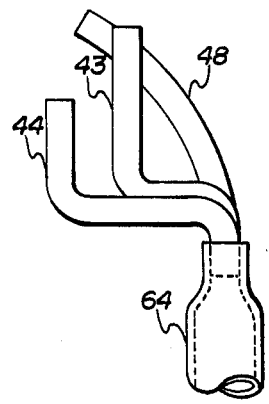
FIG. 9 is a side elevational view of one of the nozzle clusters of FIG. 5.

Referring to FIG. 9, nozzles 44, 43 and 42 are shown from a different perspective illustrating the bends in nozzles 43 and 44.

Figure 10:
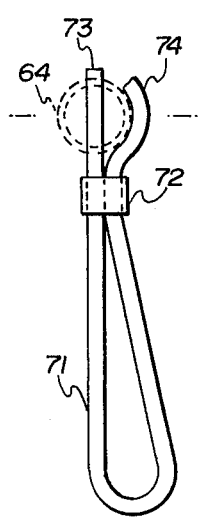
FIG. 10 is a side elevational view of the handle of the adjustment assembly of FIG. 8.

Referring to FIG. 10, handle member 71 is shown with a clamp at 72 and having ends 73 and 74 which terminate in member 64 (FIG. 8).

Figure 11:
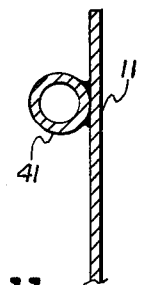
FIG. 11 is a cross sectional view taken along lines 11—11 of FIG. 5.

Referring to FIG. 11, container 11 carries a fitting tube 41 which is fixedly attached thereto as by clamp welding, etc.

Figure 12:
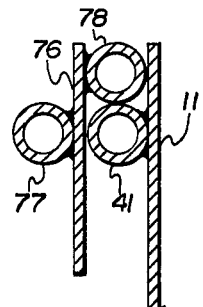
FIG. 12 illustrates the cross sectional view of FIG. 11 with an adapter ring attached thereto.

Referring to FIG. 12, container 11 is shown with fitting tube 42 and a reduction ring 76 with fitting tube 77 and spacing tube 78 carried thereby.

Figure 13:
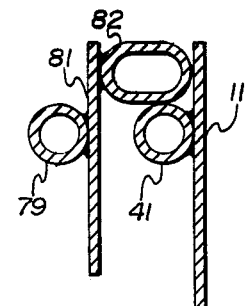
FIG. 13 illustrates the cross sectional view of FIG. 11 with another adapter ring attached thereto.

Referring to FIG. 13, container 11 is shown with fitting tube 42 and reduction ring 79 carrying a fitting tube 81 and also carrying reduction spacing tube 82.

Referring to FIG. 14, container 11 is again shown with fitting tube 42 in abutment with spacing tubes 83 and 84 fixedly attached to reduction ring 86. Reduction ring 86 fixedly carries fitting tube 87.

OPERATION

Referring to FIGS. 1 and 2, it can be seen that container 11 is dimensioned for being received by the outside surface of the brake drum and/or shoe assembly as indicated by the dotted lines extending vertically above surface 31 of container 11. The nozzles 21, 22, 23, 24, 26 and 27 are disposed slightly inward of the inside surface 28 of container 11 allowing the brake drum and/or shoe assembly to fit between inside surface 28 of container 11 and the nozzle fittings. Hence, when high pressure air is applied through valve 16 it impinges upon the inside of the brake drum and with a quarter turn rotation in each direction the entire inside area of the brake drum has been exposed to high pressure air, dislodging any dust collected thereon. Simultaneously with the application of high pressure air, a vacuum is present through vacuum hose 13 and vacuum aperture 12 which evacuates the duct from the brake drum and or shoe assembly and thereby obviates the problem of blowing brake dust into the immediate area.

Referring to FIG. 3, it can be seen that through the use of adapter rings 32, 34 and 37, virtually any size brake drum can be accommodated without the necessity of the multiplicity of containers with the attendant inconvenience of replacing the hose, the vacuum and air hoses thereto.

Referring back to FIGS. 5–14, it can be seen that a fitting tube 41 has been added to container 11 forming an inner annular shoulder for allowing a loose slidable fit against brake drum 58 of the brake shoe assembly illustrated in FIG. 7. At the same time, the air nozzles are in close proximity with the various parts of the assembly of the brake shoe assembly as shown in FIG. 5 with respect to brake shoes 51 and 52. This also illustrates two positions of adjustment handles 49 and 51 for larger or smaller brake drums, i.e., the adjustment of 51 would be for a large brake drum and 52 and 49 for a smaller brake drum. Referring specifically to FIG. 8, it can be seen that the handle 71 easily rotates the nozzle tubes 42, 43 and 44 into any desired position corresponding with brake drum size.

Figure 14:
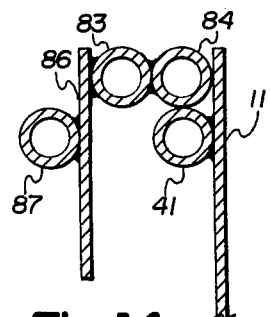
FIG. 14 illustrates the cross sectional view of FIG. 11 with a still further adapter coupled thereto.

Specifically referring to FIGS. 12, 13 and 14, it can be seen that adjustment tubes 78, 82, or 83 and 84, can be utilized to project an adapter ring or reduction ring such as 77, 79 and 87, respectively to compensate for various sizes of brake drums. The ring fittings 77, 79 and 87 then take the place of ring 41 on container member 11, (FIG. 11) and would result in the same abutment illustrated in FIGS. 6 and 7 for a close rotatable fit, which together with the adjustment of the air nozzles through their handles 49 and 51, result in the air nozzles being in close proximity with the various elements requiring dusting.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

The invention claimed is:

1. A brake drum and shoe assembly duster system comprising:
    a cylindrical container having one open end and one closed end, said open end being dimensioned for loosely receiving a brake drum and brake shoe assembly;
    an annular shoulder coupled to the inner surface of said container in proximity to said open end and dimensioned and operable for limiting the travel of said brake drum and brake shoe assembly within said container;
    a vacuum fitting coupled to an aperture centrally disposed in said closed end;
    at least two high pressure air nozzles disposed on the inside of said drum around said aperture and diametrically opposed to each other, said at least two high pressure air nozzles being adapted for coupling to a high pressure line, whereby upon rotation of said cylindrical container 180° with respect to said brake drum and shoe assembly the entire inside surface of said brake drum is exposed to at least one of said nozzles; and
    at least one reduction ring dimensioned for cooperation with said open end of said cylindrical container and said annular shoulder for adaption to a smaller sized brake drum and brake shoe assembly, said adapter ring having an annular shoulder coupled to an inner surface thereof dimensioned for and operable for limiting the travel of said brake drum and said brake shoe assembly within said adapter ring, said reduction ring being removably coupled to said open end of said cylindrical container; and
    the annular shoulder coupled to the inner surface of said container.

2. The brake drum duster system of claim 1 wherein: said at least two high pressure nozzles include adjusting means for adjusting their spatial disposition in accordance with said at least one adapter ring.

* * * * *